United States Patent
Kumar et al.

(10) Patent No.: US 11,470,111 B2
(45) Date of Patent: Oct. 11, 2022

(54) METHOD AND APPARATUS FOR MANAGING NON-INTEGRITY PROTECTED MESSAGE

(71) Applicant: Samsung Electronics Co., Ltd., Suwon-si (KR)

(72) Inventors: Lalith Kumar, Bangalore (IN); Alok Kumar Jangid, Bangalore (IN); Kailash Kumar Jha, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/105,807

(22) Filed: Nov. 27, 2020

(65) Prior Publication Data

US 2021/0084069 A1  Mar. 18, 2021

Related U.S. Application Data

(63) Continuation of application No. 16/074,574, filed as application No. PCT/KR2017/001139 on Feb. 2, 2017, now Pat. No. 10,855,720.

(30) Foreign Application Priority Data

Feb. 2, 2016 (IN) ............................ 2016 41003718
Jan. 27, 2017 (IN) ............................ 201641003718

(51) Int. Cl.
*H04W 4/00* (2018.01)
*H04L 9/40* (2022.01)
(Continued)

(52) U.S. Cl.
CPC ......... *H04L 63/1458* (2013.01); *H04W 8/183* (2013.01); *H04W 12/106* (2021.01); *H04W 12/122* (2021.01); *H04W 48/08* (2013.01); *H04W 60/00* (2013.01); *H04W 60/04* (2013.01); *H04W 68/005* (2013.01); *H04W 76/28* (2018.02); *H04W 84/042* (2013.01)

(58) Field of Classification Search
None
See application file for complete search history.

(56) References Cited

U.S. PATENT DOCUMENTS 9,621,549 B2   4/2017   Benoit et al.
9,668,236 B2*  5/2017   Ryu .................. H04W 76/28
(Continued)

*Primary Examiner* — Gerald A Smarth
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). Embodiments herein provide a method and an apparatus for managing a non-integrity protected message. The method includes receiving a reject cause message from a first public land mobile network (PLMN) in response to a transmission of a registration request message to the first PLMN, re-attempting the transmission of the registration request message to one of the first PLMN and a second PLMN, receiving registration accept message from one of the first PLMN and the second PLMN in response to the re-attempting, and resetting a counter maintained for the first PLMN by the UE.

10 Claims, 9 Drawing Sheets

(51) Int. Cl.

| | | |
|---|---|---|
| *H04W 60/04* | (2009.01) | |
| *H04W 12/106* | (2021.01) | |
| *H04W 12/122* | (2021.01) | |
| *H04W 76/28* | (2018.01) | |
| *H04W 8/18* | (2009.01) | |
| *H04W 48/08* | (2009.01) | |
| *H04W 60/00* | (2009.01) | |
| *H04W 68/00* | (2009.01) | |
| *H04W 84/04* | (2009.01) | |

(56) References Cited

U.S. PATENT DOCUMENTS

| | | | |
|---|---|---|---|
| 10,306,552 B2 * | 5/2019 | Ronneke | H04W 52/0203 |
| 2005/0037753 A1 | 2/2005 | Andersen et al. | |
| 2007/0298801 A1 | 12/2007 | Kim et al. | |
| 2008/0076420 A1 | 3/2008 | Khetawat et al. | |
| 2009/0181643 A1 | 7/2009 | Thakare | |
| 2010/0203888 A1 | 8/2010 | Gunaratnam et al. | |
| 2010/0216465 A1 | 8/2010 | Mubarek et al. | |
| 2011/0171926 A1 * | 7/2011 | Faccin | H04W 48/18 455/404.1 |
| 2012/0171993 A1 | 7/2012 | Tiwari | |
| 2012/0178449 A1 | 7/2012 | Liao | |
| 2012/0257536 A1 | 10/2012 | Kholaif et al. | |
| 2013/0203411 A1 | 8/2013 | Cheng | |
| 2014/0068722 A1 | 3/2014 | Hayat | |
| 2014/0153408 A1 | 6/2014 | Jun et al. | |
| 2014/0269613 A1 * | 9/2014 | Tiwari | H04W 12/108 370/331 |
| 2015/0140998 A1 | 5/2015 | Kim et al. | |
| 2015/0312847 A1 | 10/2015 | Lehoux | |
| 2016/0211986 A1 * | 7/2016 | Diachina | H04W 4/70 |
| 2016/0262130 A1 * | 9/2016 | Johansson | H04W 68/02 |
| 2017/0339611 A1 * | 11/2017 | Lan | H04W 52/0254 |
| 2018/0184246 A1 * | 6/2018 | Ryu | H04W 68/06 |
| 2018/0220289 A1 * | 8/2018 | Ryu | H04W 4/02 |

\* cited by examiner

[Fig. 1]
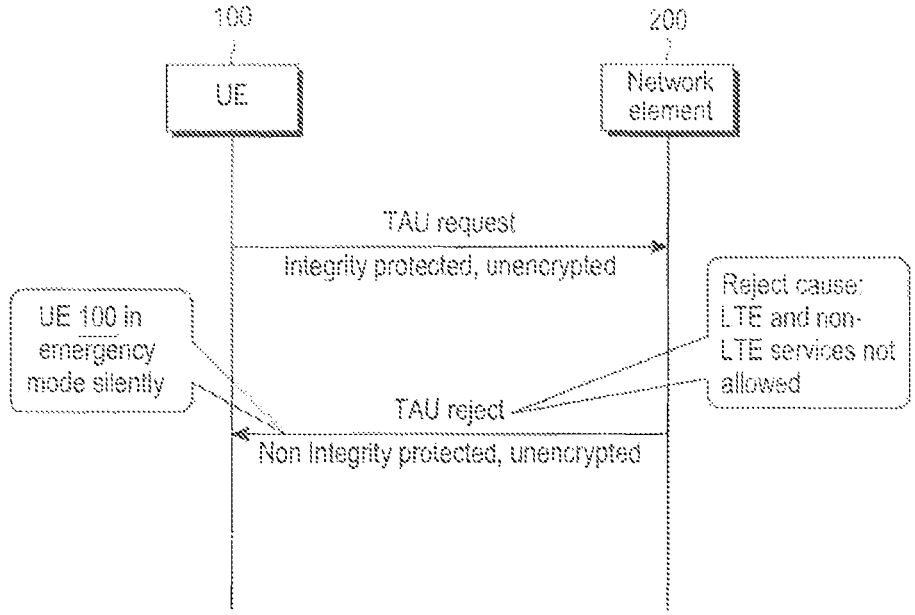
[Fig. 2]
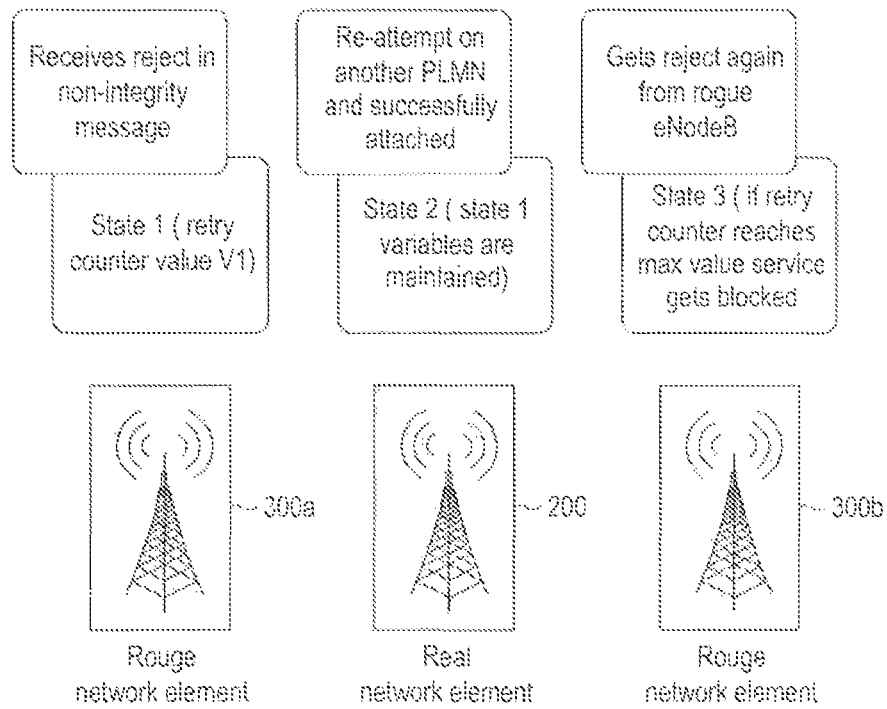

[Fig. 3]
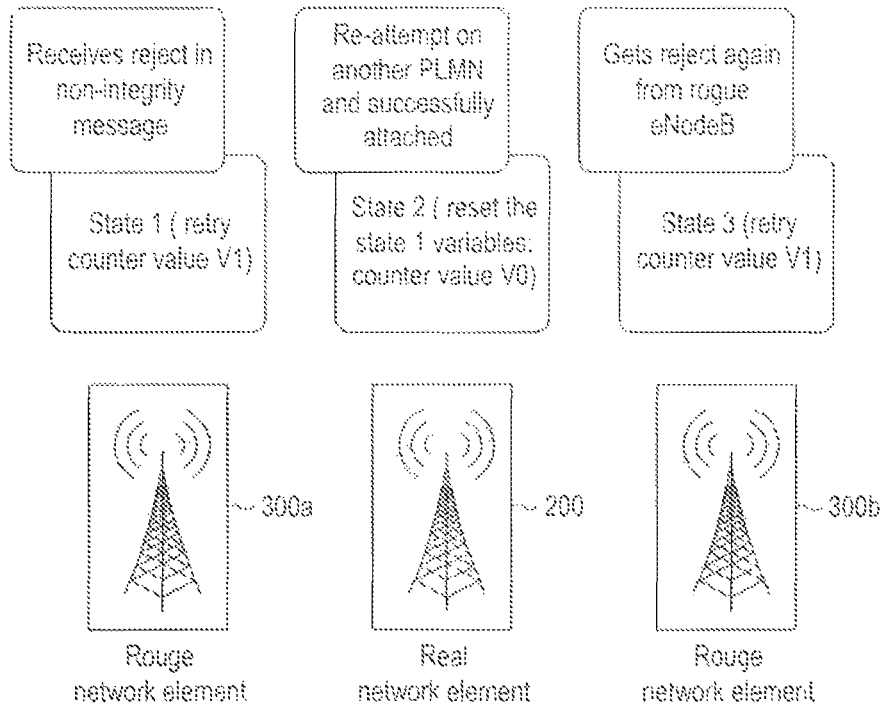
[Fig. 4]
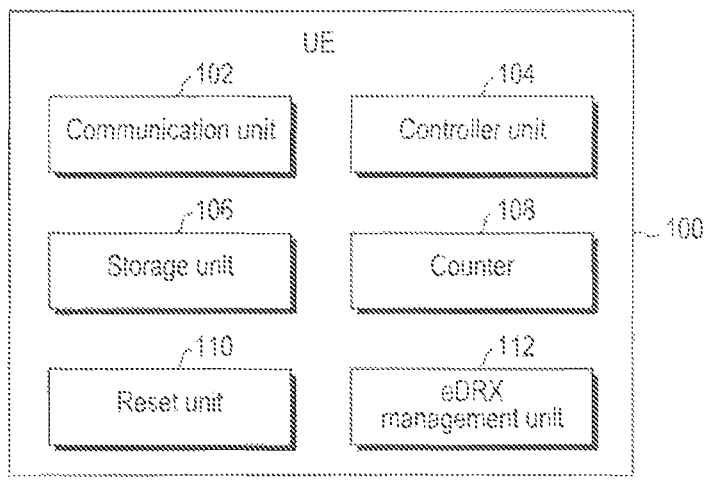

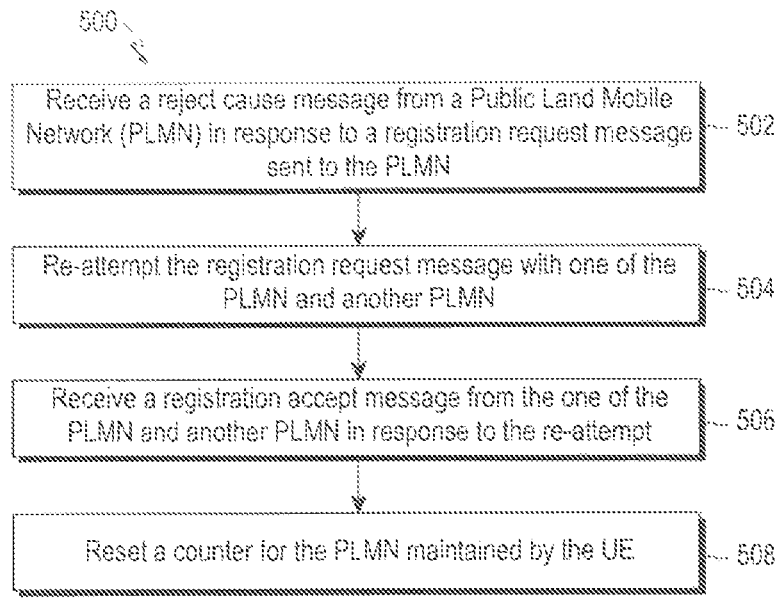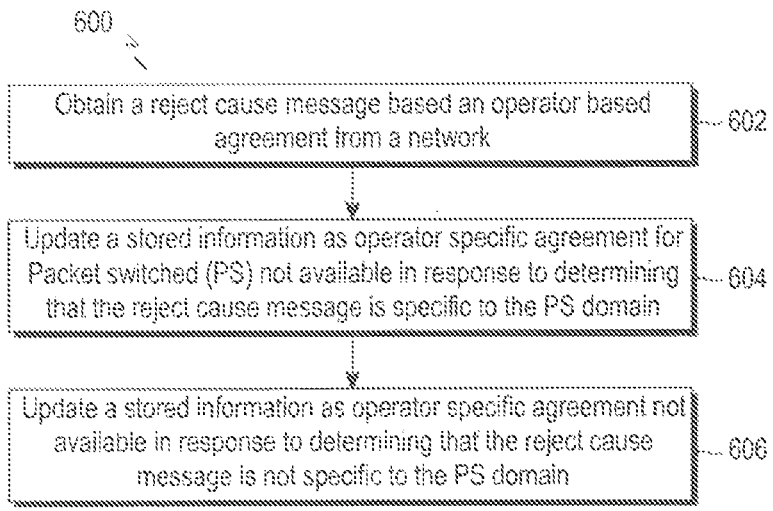

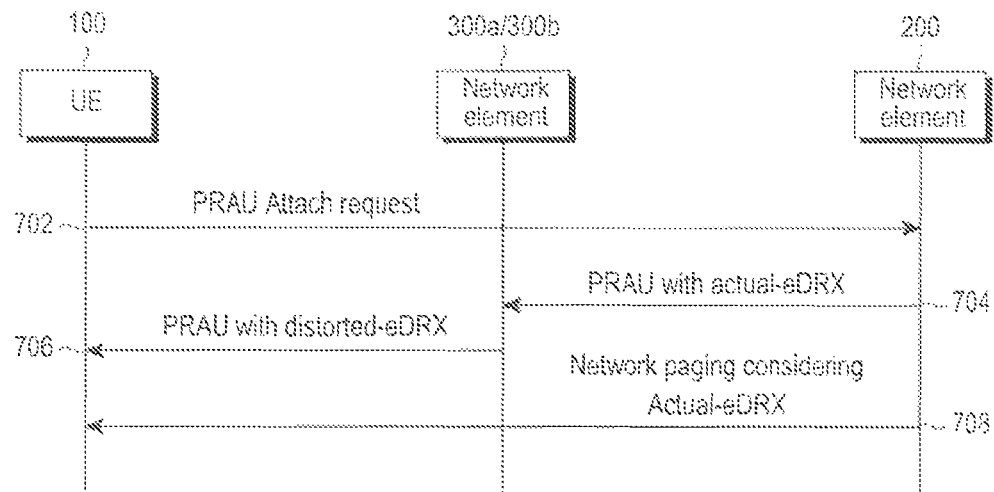
[Fig. 7]
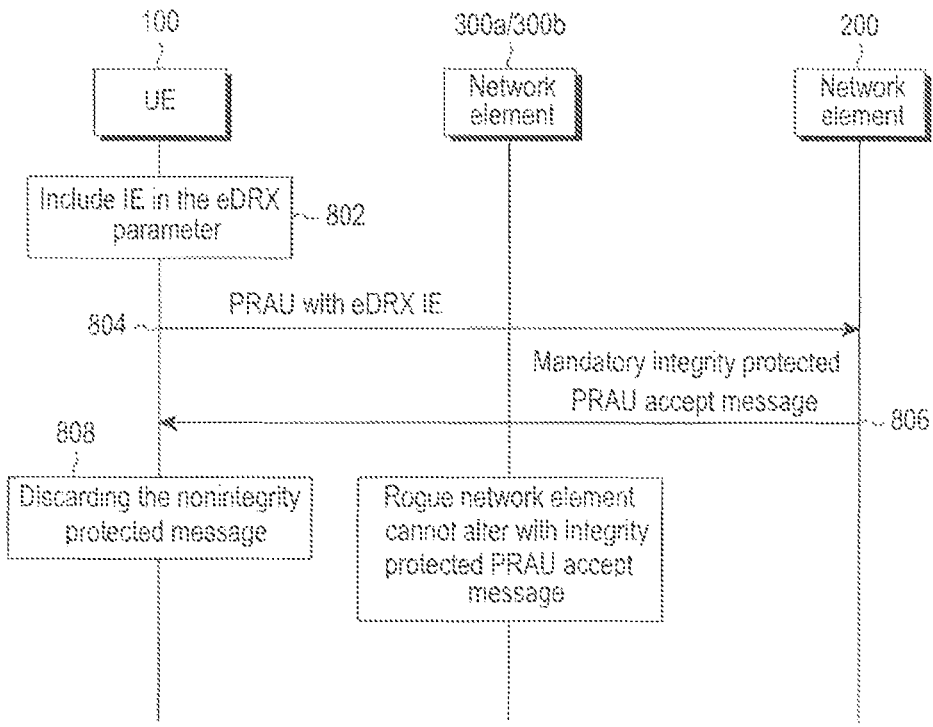
[Fig. 8]

[Fig. 9a]
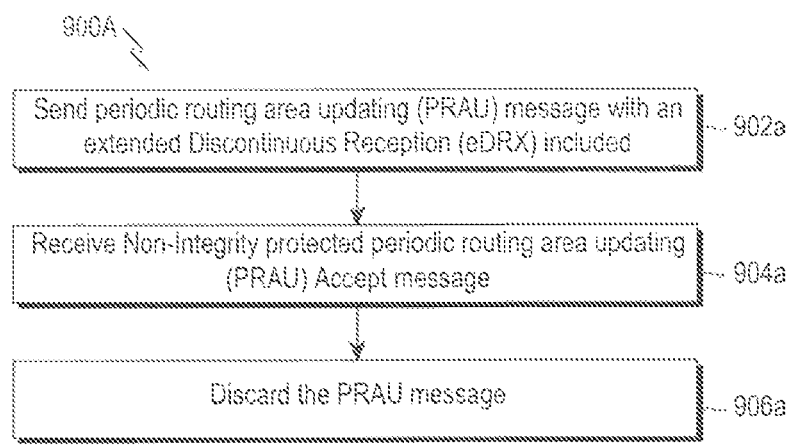
[Fig. 9b]
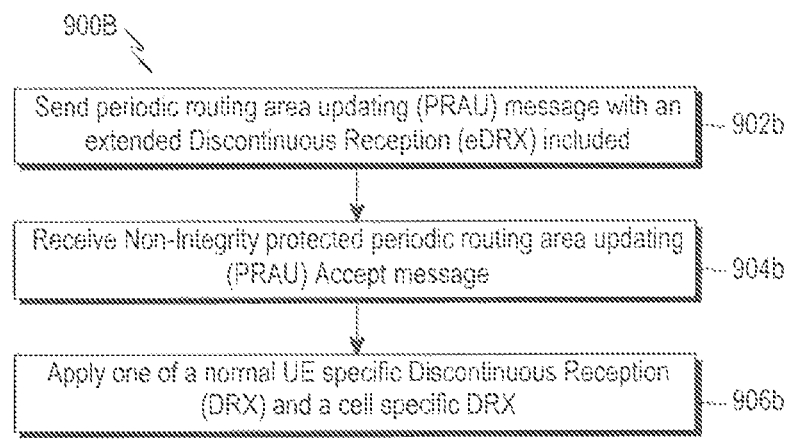

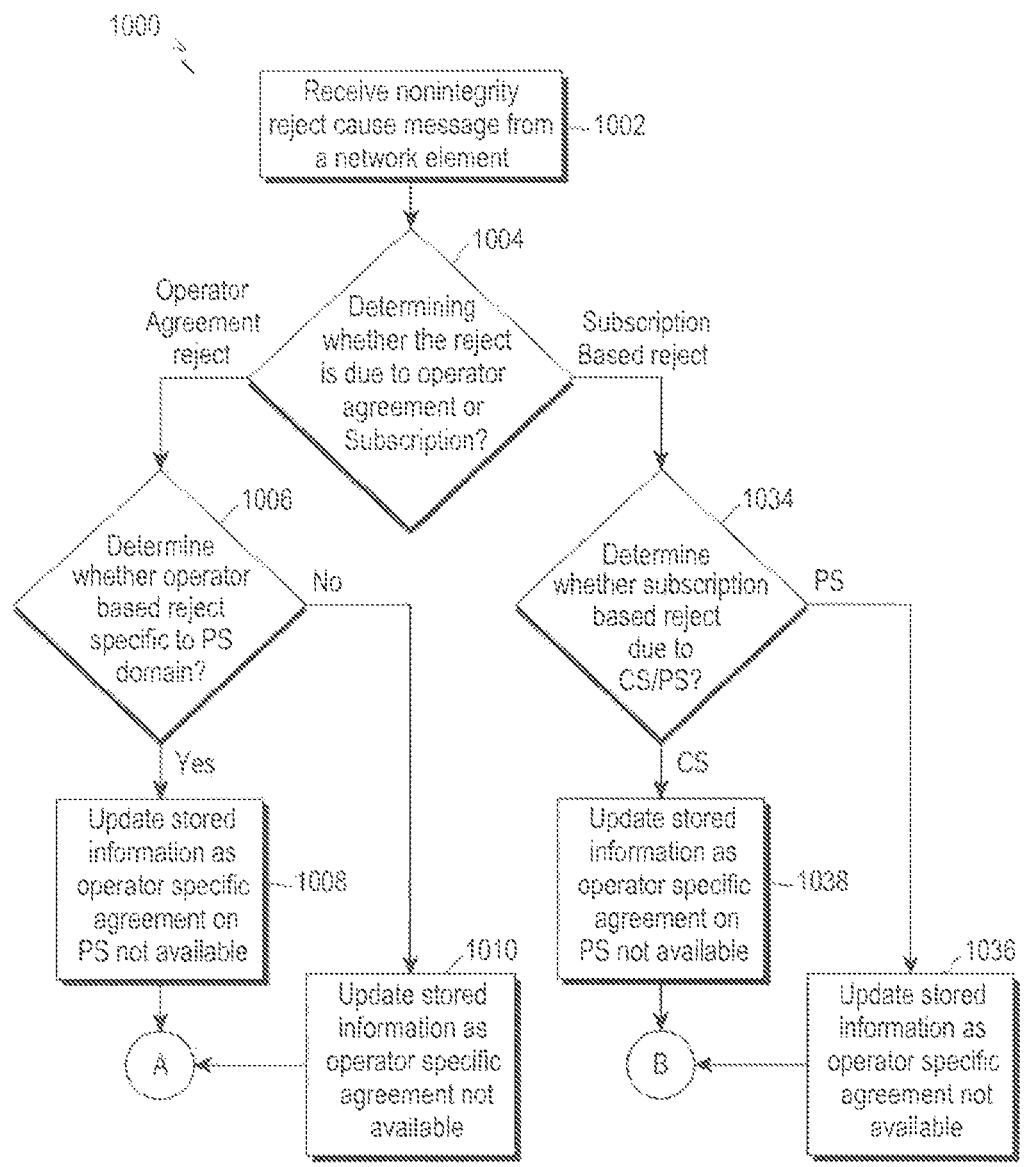

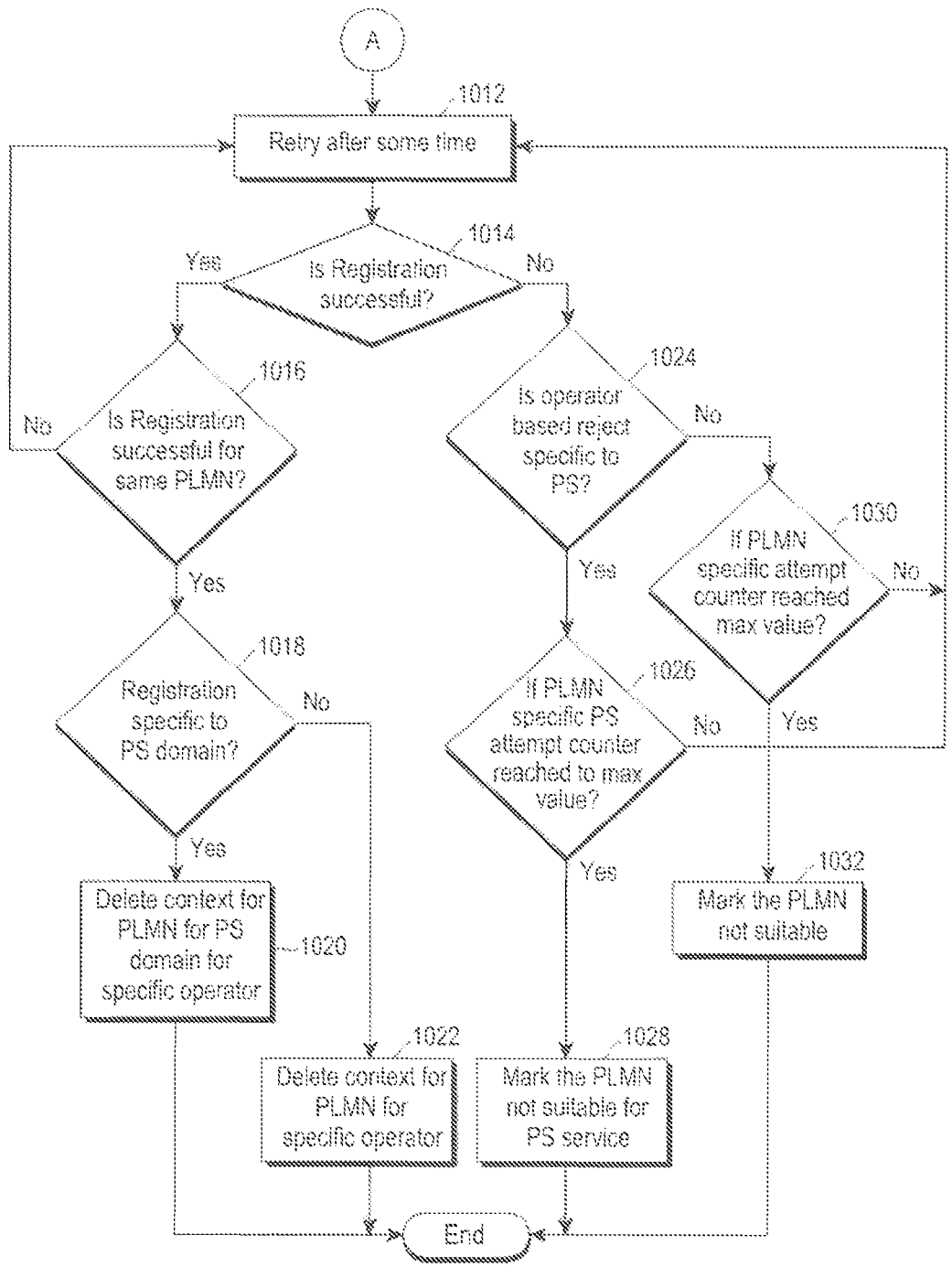

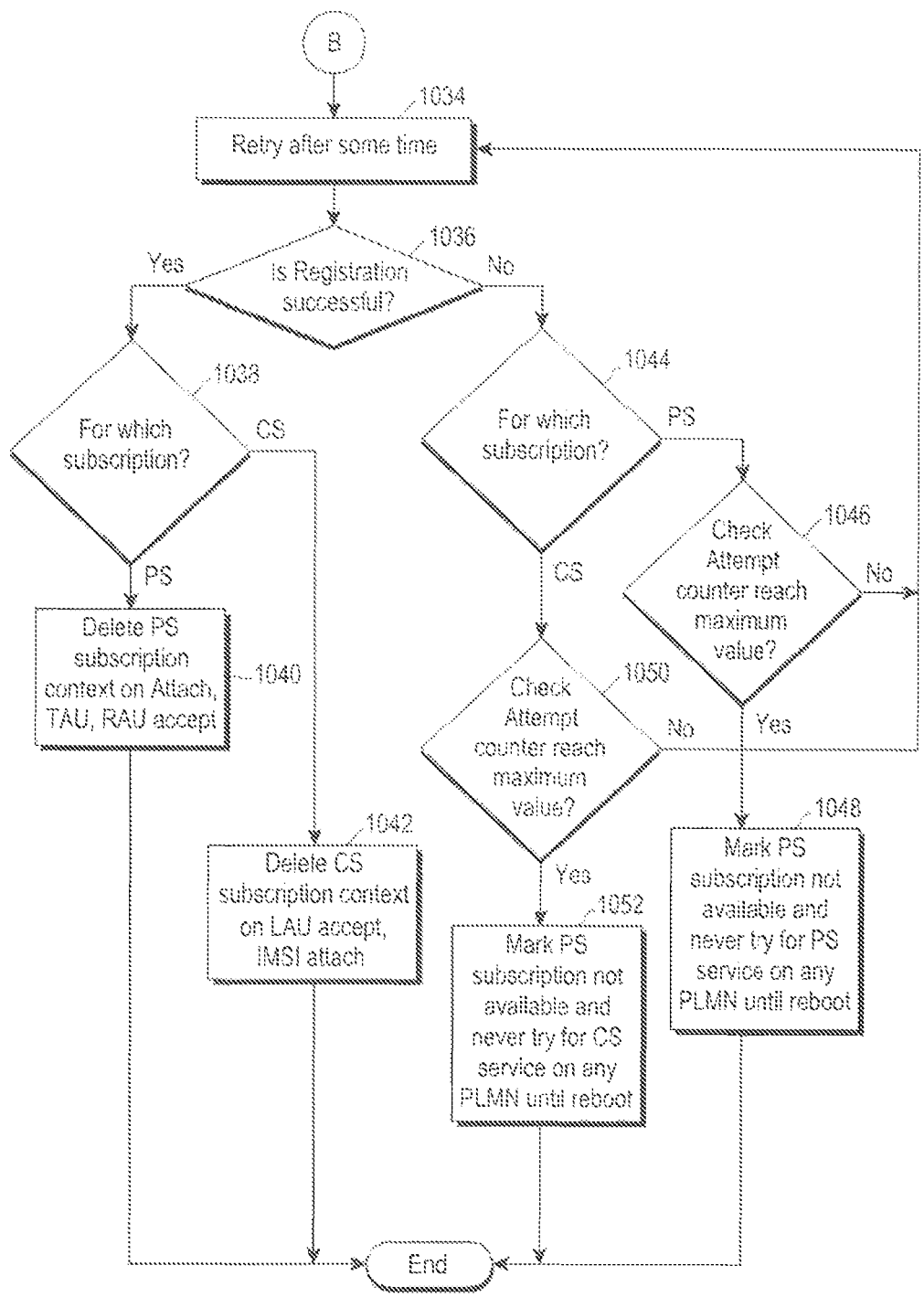
[Fig. 10c]

[Fig. 11]
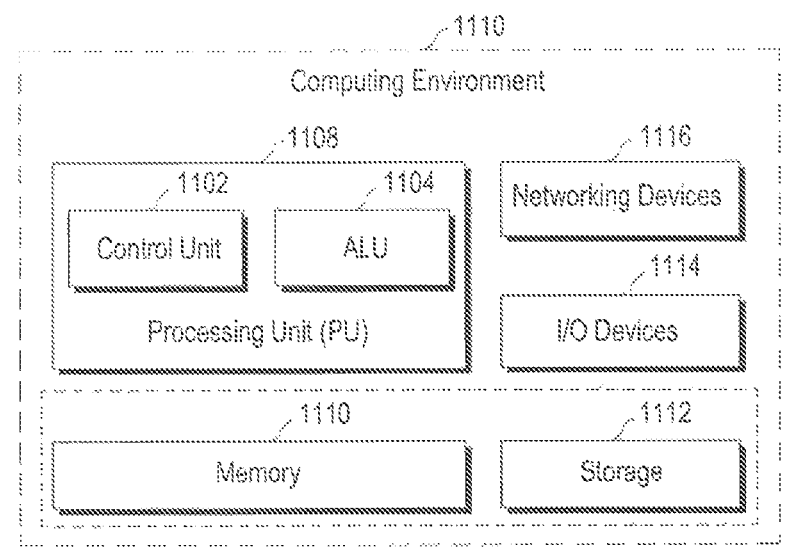

METHOD AND APPARATUS FOR MANAGING NON-INTEGRITY PROTECTED MESSAGE

CROSS-REFERENCE TO RELATED APPLICATION(S)

This application is a continuation of prior application Ser. No. 16/074,574, filed on Aug. 1, 2018, which will be issued as U.S. Pat. No. 10,855,720 on Dec. 1, 2020, which is a U.S. National Stage application under 35 U.S.C. § 371 of an International application number PCT/KR2017/001139, filed on Feb. 2, 2017, which is based on and claimed priority of an Indian patent application number 201641003718, filed on Feb. 2, 2016, in the Indian Intellectual Property Office and of an Indian patent application number 201641003718, filed on Jan. 27, 2017, in the Indian Intellectual Property Office, the disclosure of each of which is incorporated by reference herein in its entirety.

TECHNICAL FIELD

The present disclosure relates generally to wireless communication systems, and more particularly, to a method and an apparatus for managing a Non-Integrity protected message.

BACKGROUND ART

To meet the demand for wireless data traffic having increased since deployment of 4G ($4^{th}$-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

There is vulnerability in the specifications of the 3rd Generation Partnership Project (3GPP) that a denial of service attack against mobile terminals (herein interchangeably referred to as user equipment (UE)) from a fraudulent/rogue network is possible due to lack of ability to proceed mutual authentication and integrity protection. Therefore, it is evident that UE cannot, in every case, be sure about the reliability of the network element(s) to which the UE is accessing or attempting to access. For instance, when the UE receives a non-integrity protected reject message from the network element then there is a potential threat for disruption in the services provided to the UE. Such an attack is carried out by a counterfeit network element. This attack can be carried out by providing permanent causes of rejection to the UE. As such, the UE will render its subscriber identity module (SIM) invalid for that particular service.

In certain cases, where a Universal Subscriber Identity Module (USIM) is indeed valid, the rogue network element may send non-integrity protected reject message(s) with certain reject cause to the UE and, at reception of that reject cause, the UE shall consider the USIM invalid. This means that the UE, even with a valid USIM, can be getting out of service by the fraudulent network element.

For example, considering the following causes of rejection are received. The causes of rejection, for example, includes reject cause #3 (Illegal UE), reject cause #6 (Illegal ME), and reject cause #8 (EPS services and non-EPS services not allowed). In such circumstances, the UE considers the USIM as invalid for EPS and/or non-EPS services until the electronic device consisting of the USIM is switched off, or the UICC containing the USIM is removed. Such causes of rejection of services to the UE that are not integrity protected provide scope for any counterfeit network element to disrupt the user service even permanently. Further, it becomes extremely critical for IOT devices where no manual intervention will be there and technician needs to go to remote location and reboot the device.

FIG. 1 illustrates an example scenario where a UE 100 communicates a tracking area update (TAU) request message with a network element 200. The UE 100 sends the TAU request message, which is integrity-protected using the existing Non-access stratum (NAS) security context but not encrypted. As a result, a rogue eNodeB can decode it and respond with a "TAU Reject" message including reject cause (for example, cause #7-"LTE services not allowed") without the integrity protection. According to the current specification TS24.301, this reject message will be processed by the UE 100, which reacts on the indicated rejection cause by deleting all existing Evolved Packet System (EPS) context. Furthermore, the UE 100 updates the status to "EU3 ROAMING NOT ALLOWED" and considers the USIM (and hence the UE 100) as invalid for the EPS services until it is rebooted or the USIM is re-inserted. Thus, the rogue eNodeB can use this procedures to block the UE 100 services permanently by giving non-integrity (non-security) protected message.

DISCLOSURE OF INVENTION

Technical Problem

The principal object of the embodiments herein is to provide a method and an apparatus for managing a Non-Integrity protected message.

Another object of the embodiments herein is to provide solutions to circumvent the problems associated with existing approaches as specified in the standard specification. Thus, considering the accelerated vulnerabilities with respect to the security of the communication network it is very imperative for the UE to avail services from a real network. As the impact of the fraudulent/rogue network element may cause serious threat to the UE and other related devices (i.e., IoT devices). The serious threat such as, for example, UE will permanently enters into emergency mode, UE will not try for PS/CS domain until power cycle is executed by user, or the like.

Yet another object of the embodiments herein is to determine, by the UE, whether the reject cause message received from the network element is subscription based reject/operator agreement based reject.

Yet another object of the embodiments herein is to reset, by the UE, counter value maintain the context associated with one or more reject cause messages whenever registration accept message is received from the network element.

Yet another object of the embodiments herein is to discard the PRAU message in response to receiving a Non-Integrity protected periodic routing area updating (PRAU) Accept message from the network element.

Solution to Problem

In accordance with an aspect of the present invention a method for managing a Non-Integrity protected message. The method includes receiving a reject cause message from a Public Land Mobile Network (PLMN) in response to a registration request message sent to the PLMN. Further, the method includes re-attempting the registration request message with one of the PLMN and another PLMN. Furthermore, the method includes receiving registration accept message from one of the PLMN and another PLMN in response to the re-attempt and resetting a counter maintained for the PLMN by the UE.

In an embodiment, resetting the counter includes determining registration accept message is one of a General Packet Radio Service (GPRS) registration accept message and Evolved Packet System (EPS) attach accept message, and resetting one of a PLMN specific attempt counter and a PLMN-specific PS-attempt counter.

In an embodiment, resetting the counter includes determining the registration accept message is a General Packet Radio Service (GPRS) registration accept message and Evolved Packet System (EPS) attach accept message, and resetting a counter maintained for the Subscriber identity module (SIM)/Universal Subscriber Identity Module (USIM) considered invalid for GPRS services.

In an embodiment, resetting the counter includes determining that the registration accept message is one of a Combined attach successful message for GPRS and non-GPRS services and Combined attach successful message for EPS and non-EPS services, and resetting one of a counter maintained for a SIM/USIM considered invalid for non-GPRS services and a counter maintained for a SIM/USIM considered invalid for GPRS services.

In an embodiment, resetting the counter includes determining the registration accept message is a periodic routing area updating (PRAU) procedure accept message and resetting one of a PLMN specific attempt counter and a PLMN-specific PS-attempt counter.

In an embodiment, resetting the counter includes determining the registration accept message is a periodic routing area updating (PRAU) procedure accept message and resetting a counter maintained for a SIM/USIM considered invalid for non-GPRS services.

In an embodiment, resetting the counter includes determining the registration accept message is a Combined RAU accept message and resetting one of a counter maintained for a SIM/USIM considered invalid for non-GPRS services and a counter maintained for a SIM/USIM considered invalid for GPRS services.

In an embodiment, resetting the counter includes determining registration accept message is a Location area updating (LAU) accept message and resetting a PLMN-specific PS-attempt counter.

In an embodiment, resetting the counter includes determining the registration accept message is a Location area updating (LAU) accept message and resetting a counter maintained for a SIM/USIM considered invalid for GPRS services.

In an embodiment, resetting the counter includes determining that the registration accept message is a tracking area updating (TAU) procedure accept message and resetting one of a PLMN specific attempt counter and a PLMN-specific PS-attempt counter.

In an embodiment, resetting the counter includes determining that the registration accept message is a tracking area updating (TAU) procedure accept message and resetting a counter maintained for a SIM/USIM considered invalid for GPRS services.

In an embodiment, resetting the counter includes determining that the registration accept message is a Combined tracking area updating successful accept message and resetting one of a counter maintained for a SIM/USIM considered invalid for non-GPRS services and a counter maintained for a SIM/USIM considered invalid for GPRS services.

In an embodiment, resetting the counter includes determining that the registration accept message is a Combined tracking area updating successful accept message and resetting one of a PLMN specific attempt counter and a PLMN-specific PS-attempt counter.

In accordance with an aspect of the present disclosure, a method for managing a Non-Integrity protected reject message. The method includes obtaining a reject cause message based an operator based agreement from a network element. Further, the method includes updating a stored information as operator specific agreement for Packet switched (PS) not available in response to determining that the reject cause message is specific to the PS domain. Furthermore, the method includes updating a stored information as operator specific agreement not available in response to determining that the reject cause message is not specific to the PS domain.

In accordance with an aspect of the present disclosure, a method for managing a Non-Integrity protected reject message. The method includes sending a periodic routing area updating (PRAU) message with an extended Discontinuous Reception (eDRX) included. Further, the method includes receiving Non-Integrity protected periodic routing area updating (PRAU) Accept message. Furthermore, the method includes discarding the PRAU message.

In accordance with an aspect of the present disclosure, a method for managing a Non-Integrity protected reject message. The method includes sending a periodic routing area updating (PRAU) message with an extended Discontinuous Reception (eDRX) included. Further, the method includes receiving a Non-Integrity PRAU Accept message. Furthermore, the method includes applying one of a normal UE specific Discontinuous Reception (DRX) and a cell specific DRX.

In an embodiment, the one of the normal UE specific Discontinuous Reception (DRX) and the cell specific DRX is applied by not applying (i.e., avoiding) the eDRX received in the PRAU Accept message.

In accordance with an aspect of the present disclosure, a UE for managing a Non-Integrity protected reject message is provided. The UE includes a controller unit couple to: a communication unit, a storage unit, a counter, a reset unit and an eDRX management unit, the controller unit, coupled to the, communication unit configured to receive a reject cause message from a Public Land Mobile Network (PLMN) in response to an registration request message sent to the PLMN. Further, the controller unit can be configured to re-attempt the registration request message with one of the PLMN another PLMN. Further, the communication unit can be configured to receive the registration accept message from one of the PLMN and another PLMN in response to the re-attempt. Once, the registration accept message is received from one of the PLMN and another PLMN then, the reset unit can be configured to reset the counter maintained for the PLMN.

In accordance with an aspect of the present disclosure, a UE for managing a Non-Integrity protected reject message is provided. The UE includes a controller unit couple to a communication unit, storage unit, a counter, a reset unit and an eDRX management unit, the controller unit, coupled to the, communication unit configured to obtain a reject cause message based an operator based agreement from a network element. Further, the controller unit can be configured to update a stored information as operator specific agreement for Packet switched (PS) not available in response to determining that the reject cause message is specific to the PS domain. Furthermore, the controller unit can be configured to include update a stored information as operator specific agreement not available in response to determining that the reject cause message is not specific to the PS domain.

In accordance with an aspect of the present disclosure, a UE for managing a Non-Integrity protected reject message is provided. The UE includes a controller unit couple to a communication unit, storage unit, a counter, a reset unit and an eDRX management unit, the controller unit configured to send a periodic routing area updating (PRAU) message with an extended Discontinuous Reception (eDRX) included. Further, the controller unit can be configured to receive a Non-Integrity protected periodic routing area updating (PRAU) Accept message. Furthermore, the controller unit can be configured to discard that PRAU message.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

Various example embodiments of the present disclosure are illustrated in the accompanying drawings, throughout which like reference letters indicate corresponding parts in the various figures. The embodiments herein will be better understood from the following description with reference to the drawings, in which:

FIG. 1 illustrates an example scenario where a UE communicates a tracking area update (TAU) request message with a network element;

FIG. 2 illustrates an example scenario in which the current behavior of a UE and one or more network elements connected to the UE for managing the non-integrity protected message;

FIG. 3 illustrates an example scenario in which the current behavior of a UE and one or more network elements connected to the UE for managing the non-integrity protected message, according to an example embodiment of the present disclosure;

FIG. 4 illustrates various units of a UE for managing the non-Integrity protected reject message, according to an example embodiment of the present disclosure;

FIG. 5 is a flow diagram illustrating a method for managing the Non-Integrity protected reject message, according to an example embodiment of the present disclosure;

FIG. 6 is a flow diagram illustrating a method for managing the Non-Integrity protected reject message for operator based agreement, according to an example embodiment of the present disclosure;

FIG. 7 illustrates a sequence diagram in which the UE perform the PRAU procedure along with eDRX update procedure;

FIG. 8 illustrates a sequence diagram in which the UE perform the PRAU procedure along with eDRX update procedure, according to an example embodiment of the present disclosure;

FIG. 9*a* is a flow diagram in which the UE perform the PRAU procedure along with eDRX update procedure, according to an example embodiment of the present disclosure;

FIG. 9*b* is another flow diagram in which the UE perform the PRAU procedure along with DRX update procedure, according to an example embodiment of the present disclosure;

FIGS. 10*a* to 10*c* are a flow diagram for managing the non-integrity protected reject message, according to an example embodiment of the present disclosure; and FIG. 11 illustrates a computing environment implementing the method for managing non-integrity protected message, according to example embodiments of the present disclosure.

MODE FOR THE INVENTION

Various example embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Prior to describing the embodiments in detail, it is useful to provide definitions for key terms used herein. Unless defined otherwise, all technical terms used herein have the same meaning as commonly understood by a person having ordinary skill in the art to which this disclosure belongs.

Persistent Attackers: The persistent attackers keeps fix location and attacks on devices and can be easily caught. Further the persistent attackers can be traced easily. [By Fraud Management Systems/Revenue Assurance systems of networks].

Non-Persistent Attackers: The non-persistent attackers attacks and disappears immediately, very likely scenario as the attackers cannot be traced, UE cannot recover on its own and will remain in NO Service or Limited service permanently, IOT devices need manual intervention to recover very critical attack especially when considered from the IoT devices perspective. Thus operators are concerned more about Non-Persistent attacks and are looking forward to solve this issue in LTE 3GPP standards. The various embodiments of the present disclosure aids the solution to the operators.

Subscription based Rejects: The state where the UE has not subscribed for particular service i.e., PS service or CS device and if tries to get the service then the network element may reject the request with a reject cause. As the operator doesn't want to waste its resources further authenticating and giving security protected reject. The reject cause including PS service not available, CS service not available, or the like. After getting such reject the UE will never try for that particular service. For example if PS domain reject is received. UE will not try for PS domain until power cycle is executed by user.

Operator Agreement based Rejects: if the Operator-1 doesn't have interface to get the security context of subscriber from operator-2 (e.g., HPLMN) and hence it gives a non-security protected reject cause to the UE. The reject cause including No operator agreement, No operator agreement for CS domain, No operator agreement for PS domain. For example, after receiving reject cause from a particular PLMN, the UE will never try to get services from that PLMN.

The following documents and standards descriptions are hereby incorporated into the present disclosure as if fully set forth herein: 3GPP TS 24.008 V 13.5.0, TS 24.301 V 13.5.0, TDoc No.: C1-160952 (CR No. 2936) Section 4.1.1.1.1 "Integrity Checking of Signaling Messages in the Mobile Station (IU mode only)", TDoc No. C1-161550 (CR No. 2927) Section 4.7.3.1.3 "GPRS attach accepted by the network", Section 4.7.3.2.3.1 "Combined attach successful for GPRS and non-GPRS services", Section 4.7.5.1.3 "Normal and periodic routing area updating procedure accepted by the network", Section 4.7.5.2.3.1 "Combined routing area updating successful", Section 4.4.4.6 "Location updating accepted by the network", TDoc No. C1-161448(CR No. 2292) Section 5.5.1.2.4 "Attach accepted by the network", Section 5.5.1.3.4.2 "Combined attach successful", Section 5.5.3.2.4 "Normal and periodic tracking area updating procedure accepted by the network", Section 5.5.3.3.4.2 "Combined tracking area updating successful".

TDoc No.: C1-160952 (CR No. 2936):

4.1.1.1.1: Integrity Checking of Signalling Messages in the Mobile Station (Iu mode only) Except the messages listed below, no layer 3 signalling messages shall be processed by the receiving MM and GMM entities or forwarded to the CM entities, unless the network has activated the integrity protection for that domain.

ROUTING AREA UPDATE ACCEPT, if any of the following conditions applies: the MS performs periodic routing area updating with: no change in routing area or temporary identities; no change in T3312 extended value; no change in Network feature support value; and extended DRX parameters IE not included.

TDoc No. C1-161550 (CR No. 2927)

4.7.3.1.3: GPRS attach accepted by the network—If the ATTACH ACCEPT message from a PLMN for which a PLMN-specific attempt counter or PLMN-specific PS-attempt counter is maintained (see sub clause 4.1.1.6A), then the MS shall reset these counters. If the MS maintains a counter for "SIM/USIM considered invalid for GPRS services", then the MS shall reset this counter.

4.7.3.2.3.1: Combined attach successful for GPRS and non-GPRS services—If the MS maintains a counter for "SIM/USIM considered invalid for non-GPRS services" events (see sub clause 4.1.1.6A), then the MS shall reset this counter.

4.7.5.1.3: Normal and periodic routing area updating procedure accepted by the network—If the ROUTING AREA UPDATE ACCEPT message from a PLMN for which a PLMN-specific attempt counter or PLMN-specific PS-attempt counter is maintained (see sub clause 4.1.1.6A), then the MS shall reset these counters. If the MS maintains a counter for "SIM/USIM considered invalid for GPRS services", then the MS shall reset this counter.

4.7.5.2.3.1: Combined routing area updating successful— If the MS maintains a counter for "SIM/USIM considered invalid for non-GPRS services" events (see sub clause 4.1.1.6A), then the MS shall reset this counter.

4.4.4.6: Location updating accepted by the network—If the MS receives the LOCATION UPDATING ACCEPT message from a PLMN for which a PLMN-specific attempt counter or PLMN-specific PS-attempt counter is maintained (see sub clause 4.1.1.6A), then the MS shall reset these counters. If the MS maintains a counter for "SIM/USIM considered invalid for non-GPRS services", then the MS shall reset this counter.

TDoc No. C1-161448(CR No. 2292)

5.5.1.2.4: Attach accepted by the network—If the UE receives the ATTACH ACCEPT message from a PLMN for which a PLMN-specific attempt counter or PLMN-specific PS-attempt counter is maintained (see sub clause 5.3.7B), then the UE shall reset these counters. If the UE maintains a counter for "SIM/USIM considered invalid for GPRS services", then the UE shall reset this counter.

5.5.1.3.4.2: Combined attach successful—If the UE maintains a counter for "SIM/USIM considered invalid for non-GPRS services" events (see sub clause 5.3.7B), then the UE shall reset this counter.

5.5.3.2.4: Normal and periodic tracking area updating procedure accepted by the network—If the UE receives the TRACKING AREA UPDATE ACCEPT message from a PLMN for which a PLMN-specific attempt counter or PLMN-specific PS-attempt counter is maintained (see sub clause 5.3.7B), then the UE shall reset these counters. If the UE maintains a counter for "SIM/USIM considered invalid for GPRS services", then the UE shall reset this counter.

5.5.3.3.4.2: Combined tracking area updating successful—If the UE maintains a counter for "SIM/USIM considered invalid for non-GPRS services" events (see sub clause 5.3.7B), then the UE shall reset this counter.

Accordingly the embodiments herein provide a method and UE for managing a Non-Integrity protected reject message. The method includes receiving a reject cause message from a Public Land Mobile Network (PLMN) in response to a registration request message sent to the PLMN. Further, the method includes re-attempting the registration request message with one of the PLMN and another PLMN. Furthermore, the method includes receiving a registration accept message from one of the PLMN and another PLMN in response to the re-attempt and resetting a counter maintained for the PLMN by the UE.

Accordingly the embodiments herein provide a method and UE for managing a Non-Integrity protected reject message. The method includes receiving a reject cause message based on operator based agreement from a network element. Further, the method includes updating a stored information as operator specific agreement for Packet switched (PS) not available in response to determining that the reject cause message is specific to the PS domain. Furthermore, the method includes updating a stored information as operator specific agreement not available in response to determining that the reject cause message is not specific to the PS domain.

Unlike conventional systems and methods, where if periodic RAU/TAU procedure fails due to abnormal situation then the UE will start retry timer T3311/T3411. However, in meanwhile, if EMM/GMM goes to connected mode the UE will stop the retry timers (T3311/T3411) which can make the UE to not send the PRAU/PTAU message to the network. But this will conclude on the UE side that the network has rejected the eDRX parameter request and it will not apply for eDRX again. The according to one or more embodiments of the present disclosure if the eDRX was included in PRAU or PTAU message (i.e., UE also tried to do eDRX negotiation) and the EMM/GMM goes to connected mode still then UE should not stop timer T3311/T3411 so that it will allow Periodic RAU or Periodic TAU to happen mandatorily.

According the embodiments herein provide a method and UE for managing a Non-Integrity protected reject message. The method includes receiving a periodic routing area updating (PRAU) message with an extended Discontinuous Reception (eDRX) from a PLMN. Further, the method includes discarding the PRAU message.

Unlike conventional systems and methods, where the UE performs PRAU procedure with eDRX request. Network provides PRAU Accept message in which eDRX IE is distorted by attacker (i.e., rogue network element). Both the UE and the network element will be out of sync for paging channel reading duration. However UE will assume that it is registered with network element expecting MT service. But UE will not be able to avail any of the MT services from the network element. The one or more embodiments of the present disclosure may allow the network element to mandatorily provide the integrity protected PRAU Accept Message in response to determining the eDRX IE parameters is included by the UE in a PRAU request message. If the Non-integrity protected Accept message is received, then the UE will drop the Non-integrity protected Accept message and resend the PRAU request message with eDRX IE parameters included therein.

Referring now to the drawings, and more particularly to FIGS. 2 through 11, where similar reference characters denote corresponding features consistently throughout the figures, these are shown preferred embodiments.

Unlike to the conventional method where, for example, when the non-integrity protected Non-Access Stratum (NAS) reject cause message is received (For example, TAU Reject, RAU Reject, LAU Reject, Service Reject) from the network element 200. For example reject cause message can include, for example, (Mobility Management (MM), GMM or EPS Mobility Management (EMM)) #2, #3, #6, #7, #8 may make the UE 100 to increment the counter depending on the reject cause message which can make SIM/USIM invalid for (E)PS/CS services: SIM/USIM considered invalid for GPRS services, SIM/USIM considered invalid for non-GPRS services. Similarly if the reject cause #11 or #35 are received then the UE 100 increments the PLMN specific attempt counter. If reject cause #14 is received the UE 100 increments PLMN specific PS attempt counter. Further if the PLMN specific attempt counter/the PLMN specific PS attempt counter reaches maximum attempt count provided by the UE 100 then the non-integrity protect reject is considered from the real network element and not the FAKE network element and corresponding network element 300a/300b (i.e., PLMN) is added to forbidden PLMN list or forbidden PLMN for GPRS service list or SIM/USIM considered invalid for GPRS service or SIM/USIM considered invalid for non-GPRS services.

However Random attacks/non-persistent attacks i.e., fake network elements can give reject and in some time shut down or disappear. The UE 100 then moves on to its original network element to get the service. Now, the fake network is turned ON again give the same reject which will increment the counter. This continuous till maximum attempt counter is reached, then the UE 100 will assume that reject is from actual network element and can make SIM/USIM invalid or add PLMN to be part of FPLMN list or FPLMN for GPRS service list and becomes a case of denial of service attack (DOS) attack, as detailed in FIG. 2.

The FIG. 2 illustrates an example scenario in which the current behavior of a UE 100 and one or more network elements connected to the UE 100 for managing the non-integrity protected message, according to prior art.

If the non-persistent attackers attacks the UE 100 and moves away, the UE 100 can still retry and regain service if there is any real network element available. This way, there are chances that the UE 100 can recover from the non-persistent attack and the UE 100 services will not get blocked. However to detect genuine network element rejects, the UE 100 will try for "X" no. of times. Referring to the FIG. 2, consider the UE 100 moving and tried signaling on a network element 300a (e.g., rogue PLMN/eNodeB, non-persistent attackers) and gets the Non-integrity protected message containing reject cause. Due to the reject cause, the UE 100 increments reject count (i.e., counter value "V1") and start a retry timer, the state variables (i.e., state information) along with the counter value, during the state-1, is maintained by the UE 100. The UE 100 may detect another network element 200, during state-2, and gets successfully attached. But state variables are maintained at this point as per current 3GPP specification (i.e., specification prior to this present disclosure). Further, in state-3, the non-persistent attackers (i.e., network element 300b) come again and attack on the UE 100, as the state variables were maintained, during state-1 and state-3, the UE 100 gets blocked for certain services as per reject cause handling after "X" attempts.

FIG. 3 illustrates an example scenario in which the current behavior of the UE 100 and one or more network elements connected to the UE 100 for managing the non-integrity protected message, according to an embodiment as disclosed herein. The one or more network elements can be, for example, Evolved Node B (eNodeB), a Node B or a Base Transceiver Station (BTS), and a Public Land Mobile Network (PLMN) associated with a network.

Unlike to the conventional method (shown by FIG. 2), where the UE 100 does not distinguish whether the non-Integrity protected reject was from a fake eNodeB or a real eNodeB. As the UE 100 generically handles the non-Integrity protected reject message by retrying "X" number of times. The proposed method can therefore circumvent the UE 100 from being affected by the fake eNodeB by determining whether the non-Integrity protected reject provided to the UE 100 is from the real eNodeB or fake eNodeB by considering the following: the UE 100 should not overload the genuine network element 200 and at the same time recover from denial of service attack (DOS) attack quickly, to detect and understand that previously stored reject context should be deleted or not, and whether the non-Integrity protected reject was subscription based or based on operator agreements.

Unlike to the conventional method (shown by FIG. 2), the proposed method allows the UE 100 to reset the counter maintaining a state variables/stored state information associated with one or more reject cause messages.

Referring to the FIG. 3, consider the UE 100 moving and tried signaling on the network element 300a (e.g., rogue PLMN/eNodeB) and gets the non-integrity protected message containing reject cause. Due to the reject cause, the UE 100 increments the reject count (i.e., counter value "V1") and start a retry timer, the state variables along with the counter value, during state-1, is maintained by the UE 100. The UE 100 may detect another network element 200, during state-2, and gets successfully attached. Thus, when the UE 100 receives the ATTACH ACCEPT message (i.e., registration accept message) from the network element 200 the UE 100 may reset the counter maintained ("V1" to "V0"). Further, in state-3, when the non-persistent attackers (i.e., network element 300b) come again and attack on the UE 100, as the state variables were reset, during state-2, the UE 100 may not get blocked/affected by the non-persistent attackers.

Thus, according to an example embodiment of the present disclosure, if the UE 100 receives the ATTACH ACCEPT (i.e., registration accept) message from one of the network element 200 and another PLMN (not shown), the UE 100 shall reset the counter (or one of the PLMN specific attempt counter and the PLMN specific PS attempt counter) which the UE 100 would have started when it received the relevant NAS non-integrity protected message, i.e., If the UE 100 receives the (E)PS domain accept (for example Attach/RAU/TAU Accept) then it can reset the counters PLMN specific attempt counter maintained for SIM/USIM considered invalid for GPRS services counter. Also if the PS domain accept is from the network element 200 which is part of maintained list then the UE 100 can reset "the PLMN specific PS attempt counter".

Similarly, if the UE 100 receives the CS domain accept (For example LAU accept/combined RA/LA accept/combined TA/LA accept) then it can reset the counter 108 maintained the state stored information i.e., "SIM/USIM considered invalid for non-GPRS services". If the UE 100 receives the registration accept message from one of the PLMN 200 and another PLMN (not shown in the FIGS) for which PLMN specific attempt counter is increased. Then the PLMN specific attempt counter is reset (i.e., set the value of counter to zero or the UE 100 doesn't maintain counter 108 against that specific PLMN). The retry timer 112 for example: T3247/T3347 (TRetry) can retry after expiry of pre-defined time or by Manual PLMN 200 selection or due to some other triggers as per the current standard/method and if the relevant ATTACH ACCEPT is received then corresponding the counter (the PLMN specific attempt counter/the PLMN specific PS attempt counter) can be reset by using the reset unit 110. This will force fake network to make an attack from fresh and also to overcome this solution fake network will have to be persistently available. If the fake network element is not available for some-time, then the DOS attack will not be possible, according to an example embodiment of the present disclosure, by resetting the corresponding attempt counters which the UE 100 would have otherwise increased when the fake network element provides the non-integrity protected NAS reject message.

FIG. 4 illustrates various units of the UE 100 for managing the non-Integrity protected reject message, according to an example embodiment of the present disclosure.

Referring to the FIG. 4, the UE 100 includes a communication unit 102, a controller unit 104, a storage unit 106, a counter 108, a reset unit 110, and an eDRX management unit 112.

The UE 100 can be, for example, a Mobile Station (MS), a data processing device, an electronic device, a Personal Computer (PC), a laptop computer, a mobile device, a smart phone, a Personal Digital Assistance (PDA), Internet of Things (IoT) device, an electronic circuit, a chipset, and an electrical circuit configured to perform the proposed method, etc. The controller unit 104 may be for example; a hardware unit, an apparatus, a Central Processing Unit (CPU), a Graphics Processing Unit (GPU)) communicatively coupled to the storage unit 106 (e.g., a volatile memory and/or a non-volatile memory); the storage unit 106 includes storage locations configured to be addressable through the controller 214a. The counter 108 includes a PLMN specific attempt counter 1081 (not shown), and a PLMN specific PS attempt counter 1082 (not shown).

The communication unit 102 coupled to the controller unit 104 can be configured to receive a reject cause message from a PLMN 200 (i.e., network element 200) in response to the registration request message sent to the PLMN 200. The reject cause message can include, for example, reject cause #2, reject cause #3, reject cause #6, reject cause #7, reject cause #8, reject cause #11, reject cause #35, etc., as shown in the following Table 1

The storage unit 106 can be configured to maintain a state information (context, state variables, or the like) associated with the reject cause message, as shown in the Table 1. Thus, by virtue of the stored state information the counter 108 can be configured to increment the counter value as "V1" for the received reject cause message.

Further, the communication unit 102 coupled to the controller unit 104 can be configured to re-attempt the registration request (i.e., attach request) message with one of the PLMN 200 (i.e., same PLMN from which the reject cause message was received) and another PLMN. Further, the communication unit 102 coupled to the controller unit 104 can be configured to receive the registration accept (i.e., attach accept) message from one of the same PLMN 200 and another PLMN in response to the re-attempt.

Further, the controller unit 104 can be configured to detect that a registration to the network element 200 (i.e., PLMN 200) is unsuccessful and determine that the registration is specific to the PS domain. Further, the controller unit 104 can be configured to determine that the PLMN specific PS attempt counter $108_2$ has reached maximum value and mark the network element 200 is not suitable for the UE 100, as shown in the Table 1.

TABLE 1

| Sl. No | Reject causes | Type of stored state information | On which specific procedure acceptance, stored state information shall be deleted | For which Operator, state information will be reset |
|---|---|---|---|---|
| 1 | Non-Integrity Reject Cause #3 | CS domain subscription not available | LAU accept, IMSI Attach | All |
| 2 | Non-Integrity Reject Cause #7 | PS domain subscription not available | Attach, RAU, TAU accept | All |
| 3 | Non-Integrity Reject Cause #11 | Operator specific agreement not available. | All | Only For specific operator |
| 4 | Non-Integrity Reject Cause #14 | Operator specific agreement only on PS domain not available | Attach, RAU, TAU accept | Only For specific operator |

Once the controller unit 104 receive the registration accept message, the reset unit 110 can be configured to reset the counter 108, the counter value "V1" to "V0". Further, the UE 100 can be configured to determine on which specific registration/attach accept procedure (i.e., LAU. TAU, IMSI, RAU, or the like) the stored state information should be deleted and for which operator state information will be reset, as shown in the Table 1.

In another embodiment, the controller unit 104 can be configured to obtain the reject cause message based on the operator based agreement from the network element 200 (i.e., PLMN 200). Further, the controller unit 104 can be configured to update the stored information (i.e., maintained in the storage unit 106) as the operator specific agreement for Packet switched (PS) not available in response to determining that the reject cause message is specific to the PS domain. Furthermore, the controller unit 104 can be configured to update the stored information as operator specific agreement not available in response to determining that the reject cause message is not specific to the PS domain.

Further, the controller unit 104 can be configured to determine that a registration is successful for a network element 200 (i.e., PLMN 200) and determine that the registration is specific to the packet switched (PS) domain.

Referring to the Table 1, the controller unit 104 can be configured to detect if the stored state information is due to subscription reject of CS domain and LAU Accept is received by the UE 100, then the reset unit 110 can reset the stored state information, irrespective of which network element 200 the UE 100 is camped. Further, the controller unit 104 can be configured to detect if the stored state information is due to subscription reject of the PS domain and RAU/TAU/Attach Accept is received by the UE 100, then the reset unit 110 can reset the stored state information, irrespective of which network element 200 the UE 100 is camped. Further, the controller unit 104 can be configured to detect if the stored state information is due to operator agreements (from the particular network element 200) reject and RAU/TAU/Attach Accept is received by the UE 100, then the reset unit 110 can reset the stored state information only if receives accept from that particular network element 200 irrespective of which specific procedure accept is received (i.e. either CS domain Accept (LAU Accept) or the PS Domain Accept (Attach/RAU/TAU).

Furthermore, the controller unit 104 can be configured to detect if the stored state information is due to the operator agreements not available only for PS domain (From a particular network element 200) reject and RAU/TAU/Attach Accept is received by the UE 100, then the reset unit 100 can reset the stored state information only if it is received from that particular network element 200 and only the PS domain specific procedure accept (i.e. only PS Domain Accept (Attach/RAU/TAU).

TABLE 2

| LAU Result | RAU Result |
|---|---|
| LAU Successful | RAU Not successful w/o integrity protection |
| LAU Unsuccessful w/o integrity protection | RAU Successful. |
| LAU Unsuccessful but Integrity protected | RAU Unsuccessful without integrity protection. |
| LAU Unsuccessful without integrity protection. | RAU Unsuccessful but Integrity protected |

Further, the controller unit 104 can be configured to delete one of a context for the PLMN for the PS domain for an operator in response to determining that that registration is specific to the PS domain and the context for PLMN for specific operator in response to determining that that registration is not specific to the PS domain, as shown in the Table 1.

Referring to the above Table 2, if the UE 100 receives the combination of messages from the MM and the GMM modules in NMO 2 (optionally over the same RRC connection) then the UE 100 cannot consider the reject is received from Fake network element (i.e., the handling for non-integrity protected NAS message section to retry by starting timer TRetry (T3247 or T3347) is not be applicable.

Unlike to the conventional systems and method, when non-integrity protected NAS message (for example RAU Reject) is received the UE 100 can always start timer T3340 (Wait for signaling connection release) in the GSM/UMTS or timer T3440 in Long-Term Evolution (LTE) Radio Access Technology (RAT) (For example when TAU Reject with cause #3). If not the UE 100 is vulnerable to attack by Fake eNode-B which may not release the RRC connection and will make the battery consumption of the UE 100 to increase as the UE 100 will continue to be in Connected mode. Thus, according to the proposed method the UE 100 can therefore reset the counter thereby preventing the UE 100 from being attacked by the Fake Enode-B, thus releasing the RRC connection and reducing the battery consumption of the UE 100.

The eDRX management unit 112 can be configured to send the periodic routing area updating (PRAU) message with the extended Discontinuous Reception (eDRX) included. Further, the eDRX management unit 112 can be configured to receive the Non-Integrity protected periodic routing area updating (PRAU) Accept message. Further, the eDRX management unit 112 can be configured to discard the PRAU message, as detailed in conjunction with FIG. 8.

Unlike to the conventional systems and methods, where if periodic RAU/TAU procedure fails due to abnormal situation then the UE 100 will start retry timer T3311/T3411. However meanwhile if EMM/GMM goes to connected mode then UE 100 will stop the timer (T3311/T3411) which can make the UE 100 to not send the PRAU/PTAU message to the network element 200. But this will conclude on the UE 100 side that the network element 200 has rejected the eDRX parameter request and it will not apply for eDRX again.

Thus, according to an example embodiment of the present disclosure, when the eDRX management unit 112 includes eDRX in PRAU or PTAU message (i.e., UE also tried to do eDRX negotiation) and EMM/GMM goes to connected mode till then the UE 100 may not stop timer T3311/T3411 and it will allow PRAU or Periodic TAU to happen mandatorily.

Further, if the timer T3311/T3411 is stopped then the UE 100 shall immediately perform normal RAU/TAU to re-negotiate eDRX parameters. i.e., only if the UE 100 fails to negotiate the eDRX parameters due to the PRAU/PTAU Failure. Furthermore, if the UE 100 enables the eDRX and last specific procedure has failed and the UE 100 determines that the retry timers (Ex: T3411 or T3311 or T3301 or T3402) are also stopped then the UE 100 may initiate specific procedure to renegotiate the eDRX with the network element 200.

In another embodiment, the eDRX management unit 112 can be configured to send the PRAU message with the eDRX included. Further, the eDRX management unit 112 can be configured to receive the Non-Integrity protected PRAU Accept message. Furthermore, the eDRX management unit 112 can be configured to apply one of a normal UE specific Discontinuous Reception (DRX) and a cell specific DRX.

The storage unit 106, coupled to the controller 104, may include a random access memory (RAM) or another type of dynamic storage device that may store information and instructions, for example an application, for execution by processor (i.e., controller) a read-only memory (ROM) device or another type of static storage device.

FIG. 5 illustrates a flow diagram 500 illustrating a method for managing the Non-Integrity protected reject message, according to an example embodiment of the present disclosure.

Referring to the FIG. 5, at step 502, the UE 100 receives the reject cause message from the PLMN 200 in response to the registration request message sent to the PLMN 200. For example, in the UE 100 as illustrated in the FIG. 4, the controller unit 104 coupled to the communication unit 102 can be configured to receive the reject cause message from the PLMN 200 in response to the registration request message sent to the PLMN 200.

At step 504, the UE 100 re-attempt the registration request message with one of the PLMN 200 and another PLMN. For example, in the UE 100 as illustrated in the FIG. 4, the controller unit 104 coupled to the communication unit 102 can be configured to re-attempt the registration request message with one of the PLMN 200 and another PLMN.

At step 506, the UE 100 receives the registration accept message from one of the PLMN 200 and another PLMN in response to the re-attempt. For example, in the UE 100 as illustrated in the FIG. 4, the controller unit 104 coupled to the communication unit 102 can be configured to receive the registration request accept message from one of the PLMN 200 and another PLMN in response to the re-attempt.

At step 508, the UE 100 resets the counter for the PLMN 200 maintained by the UE 100. For example, in the UE 100 as illustrated in the FIG. 4, the controller unit 104 coupled to the reset unit 110 can be configured to reset the counter 108 for the PLMN 200 maintained by the UE 100.

The various actions, acts, blocks, steps, etc., as illustrated in the FIG. 5 may be performed in the order presented, in a different order, or simultaneously. Further, in some embodiments, some of the actions, acts, blocks, steps, etc., may be omitted, added, modified, skipped, etc., without departing from the scope of the disclosure.

FIG. 6 is a flow diagram 600 illustrating a method for managing the Non-Integrity protected reject message for operator based agreement, according to an example embodiment of the present disclosure.

Referring to the FIG. 6, at step 602, the UE 100 obtains the reject cause message based on the operator based agreement from the network 200 (i.e., PLMN 200). For example, in the UE 100 as illustrated in the FIG. 4, the controller unit 104 coupled to the communication unit 102 can be configured to obtain the reject cause message based on the operator based agreement from the network element 200 (i.e., PLMN 200).

At step 604, the UE 100 updates the stored information as the operator specific agreement for the PS not available in response to determining that the reject cause message is specific to the PS domain. For example, in the UE 100 as illustrated in the FIG. 4, the controller unit 104 can be configured to update the stored information as the operator specific agreement for the PS not available in response to determining that the reject cause message is specific to the PS domain.

At step 606, the UE 100 updates the stored information as the operator specific agreement not available in response to determining that the reject cause message is not specific to the PS domain. For example, in the UE 100 as illustrated in the FIG. 4, the controller unit 104 can be configured to update the stored information as the operator specific agreement not available in response to determining that the reject cause message is not specific to the PS domain.

The various actions, acts, blocks, steps, etc., as illustrated in the FIG. 6 may be performed in the order presented, in a different order, or simultaneously. Further, in some embodiments, some of the actions, acts, blocks, steps, etc., may be omitted, added, modified, skipped, etc., without departing from the scope of the disclosure.

FIG. 7 illustrates a sequence diagram 700 in which the UE 100 perform the PRAU procedure along with eDRX update procedure, according to prior art.

Referring to the FIG. 7, when the UE 100 performs the PRAU and at the same time wants to use the eDRX then the UE 100 request (in operation 702) the network element 200 by including the eDRX parameters in periodic RAU procedure. However as per current design it is possible for the network element 200 to provide (in operation 704) Periodic RAU (PRAU) accept without integrity protection. This creates a security vulnerability in telecom networks. In such cases if counterfeit network element 300a/300b distorts the eDRX parameters and transmits (in operation 706) the distorted eDRX parameters tot the UE 100, then the UE 100 and the network element 200 will be out of synchronization for paging procedure. Thus, the UE 100 may end up missing the paging messages (in operation 708) and hence MT call/SMS or the like, thereby having impact on the user services.

FIG. 8 illustrates a sequence diagram 800 in which the UE perform the PRAU procedure along with eDRX update procedure, according to an example embodiment of the present disclosure.

Referring to the FIG. 8, at first the UE 100 requests (in operation 802) for the PRAU and at the same time requests (in operation 802) for the eDRX from the network element 200. The eDRX management unit 112 can be configured to include the IE in the eDRX parameter. The eDRX management unit 112 can be configured to send (in operation 804) the PRAU with eDRX IE to the network element 200. Further, the eDRX management unit 112 can be configured to receive (in operation 806) the Non-Integrity protected periodic routing area updating (PRAU) Accept message from the network element 200. Further, the eDRX management unit 112 can be configured discard (in operation 808) the PRAU message.

Unlike to the conventional method (as described in the FIG. 7), the proposed method can therefore allow the UE 100 to discard the non-integrity PRAU accept message received from the network element 200. Thus, increasing the security protocol of the UE 100 and the UE 100, therefore, can continue providing the service(s) without any interruption, which would otherwise been disrupted by the fake/rogue network/non-persistent attacker by providing the non-integrity protected message, thereby protecting the user services.

Unlike to the conventional method (as described in the FIG. 7), if the proposed eDRX management unit 112 requests for eDRX, the network element 200 always provide the integrity protected RAU accept (Including case of periodic RAU) message unless there is no change in eDRX parameters when compare to eDRX parameters negotiated with the UE 100 in last successful specific procedure i.e., the UE 100 will not accept non-integrity protected PRAU accept message unless there is no change in eDRX parameters negotiated with the network element 200 in last successful specific procedure.

Unlike to the conventional method (as described in the FIG. 7), if the proposed eDRX management unit 112 receives the eDRX parameters in the non-integrity protected PRAU accept message and eDRX parameter values are not changed in comparison with the previously received eDRX parameters from the network element 200 in last successful specific procedure, then the eDRX management unit 112 shall apply the eDRX. However, if the eDRX parameters values changes then the UE 100 shall not apply eDRX. If the UE 100 receives the eDRX in non-integrity protected PRAU accept, then the UE 100 will re-negotiate the eDRX by sending the normal RAU request to the network element 200. Further, if the UE 100 has to request for the eDRX, it never requests Periodic RAU. The UE 100 always requests for normal RAU.

Unlike to the conventional method, the UE 100 can avoid negotiation for the eDRX whenever the PRAU is executed and continue to use the eDRX parameters the UE 100 was using before sending PRAU. i.e., irrespective of what the UE 100 receives in the PRAU accept the UE 100 applies old eDRX value/parameters.

The method of FIG. 8 is not only limited to eDRX it can also be extended to normal DRX and also to Power saving mode (PSM) feature.

FIG. 9a illustrates a flow diagram 900a in which the UE 100 perform the PRAU procedure along with eDRX update procedure, according to an example embodiment of the present disclosure.

Referring to the FIG. 9a, at step 902a, the UE 100 sends the periodic routing area updating (PRAU) request message with the eDRX included to the PLMN 200. For example, in the UE 100 as illustrated in the FIG. 4, the eDRX management unit 112 coupled to the communication unit can be configured to send the PRAU request message with the eDRX included to the PLMN 200.

At step 904a, the UE 100 receives the Non-integrity PRAU accept message from the PLMN 200. For example, in the UE 100 as illustrated in the FIG. 4, the eDRX management unit 112 coupled to the communication unit can be configured to receive the Non-integrity PRAU accept message from the PLMN 200.

At step 906a, the UE 100 discards the PRAU message. For example, in the UE 100 as illustrated in the FIG. 4, the eDRX management unit 112 can be configured to discard the PRAU message.

The various actions, acts, blocks, steps, etc., as illustrated in the FIG. 9a may be performed in the order presented, in a different order, or simultaneously. Further, in some embodiments, some of the actions, acts, blocks, steps, etc., may be omitted, added, modified, skipped, etc., without departing from the scope of the disclosure.

FIG. 9b illustrates yet another flow diagram 900b in which the UE 100 perform the PRAU procedure along with normal UE 100/cell specific DRX update procedure, according to an example embodiment of the present disclosure.

Referring to the FIG. 9b, at step 902b, the UE 100 sends the periodic routing area updating (PRAU) request message with the eDRX included to the PLMN 200. For example, in the UE 100 as illustrated in the FIG. 4, the eDRX management unit 112 coupled to the communication unit can be configured to send the PRAU request message with the eDRX included to the PLMN 200.

At step 904b, the UE 100 receives the Non-integrity PRAU accept message from the PLMN 200. For example, in the UE 100 as illustrated in the FIG. 4, the eDRX management unit 112 coupled to the communication unit 102 can be configured to receive the Non-integrity PRAU accept message from the PLMN 200.

At step 906b, the UE 100 applies one of the normal UE 100 specific Discontinuous Reception (DRX) and the cell specific DRX. For example, in the UE 100 as illustrated in the FIG. 4, the eDRX management unit 112 coupled to the communication unit 102 can be configured to apply one of the normal UE 100 specific Discontinuous Reception (DRX) and the cell specific DRX.

FIGS. 10a, 10b, and 10c illustrate a flow diagram 1000 for managing the non-integrity protected reject message, according to an example embodiment of the present disclosure.

Referring to the FIGS. 10a, 10b, and 10c, at step 1002, the UE 100 receives the non-integrity reject cause message from the network element 200. For example, in the UE 100 as illustrated in the FIG. 4, the controller unit 104 coupled to the communication unit 102 can be configured to receive the non-integrity reject cause message from the network element 200.

At step 1004, the UE 100 determines whether the reject is due to operator agreement based reject or subscription based reject. For example, in the UE 100 as illustrated in the FIG. 4, the controller unit 104 can be configured to determine whether the reject is due to operator agreement based reject or subscription based reject.

If at step 1004, the controller unit 104 determines that the reject is due to the operator agreement based reject, then at step 1006, the UE 100 determine whether the operator based reject is specific to the PS domain. If at step 1006, the UE 100 determines that the operator based reject is specific to the PS domain then, at step 1008, the UE 100 updates the stored information as the operator specific agreement on the PS is not available. At step 1006, the UE 100 determines that the operator based reject is not specific to the PS domain then, at step 1010, the UE 100 updates the stored information as the operator specific agreement not available.

At step 1012, the UE 100 retries (performing the registration request with one of the network element 200 and another network element) after a pre-set time interval. At step 1014, the UE 100 determines whether the registration is successful. If at step 1014, the UE 100 determines that the registration is successful then at step 1016, the UE 100 determines whether the registration is successful for the network element 200. If at step 1016, the UE 100 determines that the registration is successful for the same network element 200 then, at step 1018, the UE 100 determines whether the registration is specific to the PS domain. If at step 1018, the UE 100 determines that the registration is specific to the PS domain then, at step 1020, the UE 100 deletes the context for the network element 200 for the PS domain for specific operator. If at step 1018, the UE 100 determines that the registration is not specific to the PS domain then, at step 1022, the UE 100 deletes context for the network element 200 for specific operator. If at step 1016, the UE 100 determines that the registration is unsuccessful for the same network element 200 then, the UE 100 loops back to the perform the step 1012.

If at step 1014, the UE 100 determines that the registration is unsuccessful then, at step 1024, the UE 100 determines whether the operator based reject is specific to the PS domain. If at step 1024, the UE 100 determines that the operator based reject is specific to the PS domain then, at step 1026, the UE 100 determines whether the PLMN specific PS attempt counter $108_2$ reached to max value. If at step 1026, the UE 100 determines that the max value for the PLMN specific PS attempt counter $108_2$ is reached then, at step 1028, the UE 100 marks the PLMN 200 (i.e., network element 200) not suitable for the PS services. If at step 1026, the UE 100 determines that the max value for the PLMN specific PS attempt counter $108_2$ is not reached then the UE 100 loops back to perform the step 1012.

If at step 1024, the UE 100 determines that the operator based reject is not specific to the PS domain then, at step 1030, the UE 100 determines whether the max value of the PLMN specific attempt counter $108_1$ has reached. If at step 1030, the UE 100 determines that the max value of the PLMN specific attempt counter $108_1$ has reached then, at step 1032, the UE 100 mark the PLMN 200 not suitable. If at step 1030, the UE 100 determines that the max value for the PLMN specific attempt counter $108_1$ is not reached then the UE 100 loops back to perform the step 1012.

If at step 1004, the controller unit 104 determines that the reject is due to the subscription based reject then at step 1034, the UE 100 determines whether the subscription based reject due to CS/PS. If at step 1034, the UE 100 determines that the reject is specific to PS domain then, at step 1036, the UE 100 updates the stored information as the operator specific agreement not available. If at step 1034, the UE 100 determines that the reject is specific to CS domain then, at step 1038, the UE 100 updates the stored information as the operator specific agreement on the PS domain not available.

At step 1034, the UE 100 retries (performing the registration request with the network element 200) after some time. At step 1036, the UE 100 determines whether the registration is successful. If at step 1036, the UE 100 determines that the registration is successful then at step 1038, the UE 100 determines whether the registration is successful for PS or CS. If at step 1038, the UE 100 determines that the registration is successful for the PS domain then, at step 1040, the UE 100 deletes the PS subscription context on receiving the registration accept message (TAU, RAU accept, or the like). If at step 1038, the UE 100 determines that the registration is successful for the CS domain then, at step 1042, the UE 100 deletes the CS subscription context on receiving the registration accept message (LAU, IMSI accept, or the like).

If at step 1036, the UE 100 determines that the registration is unsuccessful then, at step 1044, the UE 100 determines whether the registration is unsuccessful for PS or CS domain. If at step 1044, the UE determines that the registration is unsuccessful for the PS domain then, at step 1046, the UE 100 determines whether the maximum value of the counter 108 is reached. If at step 1046, the maximum value of the counter 108 is reached then, at step 1048, the UE 100 mark PS subscription not available and never try for PS service on any PLMN until reboot. If at step 1046, the maximum value of the counter 108 is not reached then the UE 100 loops back to perform the method at step 1036.

If at step 1044, the UE determines that the registration is unsuccessful for the CS domain then, at step 1050, the UE 100 determines whether the maximum value of the counter 108 is reached. If at step 1050, the maximum value of the counter 108 is reached then, at step 1052, the UE 100 mark CS subscription not available and never try for CS service on any PLMN until reboot. If at step 1050, the maximum value of the counter 108 is not reached then the UE 100 loops back to perform the method at step 1036.

FIG. 11 illustrates a computing environment implementing the method for managing non-integrity protected message, according to embodiments as disclosed herein. As depicted in the FIG. 11, the computing environment 1100 comprises at least one processing unit 1106 that is equipped with a control unit 1102 and an Arithmetic Logic Unit (ALU) 1104, a memory 1108, a storage unit 1110, plurality of networking devices 1116 and a plurality Input output (I/O) devices 1112. The processing unit 1106 is responsible for processing the instructions of the technique. The processing unit 1106 receives commands from the control unit in order to perform its processing. Further, any logical and arithmetic operations involved in the execution of the instructions are computed with the help of the ALU 1104.

The overall computing environment 1100 can be composed of multiple homogeneous and/or heterogeneous cores, multiple CPUs of different kinds, special media and other accelerators. The processing unit 1106 is responsible for processing the instructions of the technique. Further, the plurality of processing unit 1106 may be located on at least one chip or over multiple chips.

The technique comprising of instructions and codes required for the implementation are stored in either the memory unit 1108 or the storage 1110 or both. At the time of execution, the instructions may be fetched from the corresponding memory 1108 or storage 1110, and executed by the processing unit 1106.

In case of any hardware implementations various networking devices 1114 or external I/O devices 1112 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 11 include blocks which can be at least one of a hardware device, or a combination of hardware device and software module.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method for handling a non-integrity protected message by a user equipment (UE), the method comprising:
    sending, to a network, a routing area updating (RAU) request message including at least one extended discontinuous reception (eDRX) parameter;
    receiving a RAU accept message in response to the RAU request message;
    identifying whether the RAU accept message is integrity protected or not;
    in case that the RAU accept message is integrity protected, processing the RAU accept message; and
    in case that the RAU accept message is not integrity protected, discarding the RAU accept message.

2. The method of claim 1, further comprising:
    resending, to the network, the RAU request message including the at least one eDRX parameter.

3. The method of claim 1, further comprising:
    if the UE has used an eDRX parameter before sending the RAU request message, continuing to use the eDRX parameter,
    wherein the eDRX parameter is obtained during the last attach or RAU procedure.

4. The method of claim 1, further comprising:
    applying one of a normal UE specific DRX and a cell specific DRX.

5. The method of claim 4, wherein one of the normal UE specific DRX and the cell specific DRX is applied in case that the RAU accept message is not integrity protected.

6. A user equipment (UE) for handling a non-integrity protected message, the UE comprising:
    a transceiver; and
    at least one processor configured to:
        control the transceiver to send, to a network, a routing area updating (RAU) request message including at least one extended discontinuous reception (eDRX) parameter,
        control the transceiver to receive a RAU accept message in response to the RAU request message,
        identify whether the RAU accept message is integrity protected or not,
        in case that the RAU accept message is integrity protected, process the RAU accept message, and
        in case that the RAU accept message is not integrity protected, discard the RAU accept message.

7. The UE of claim 6, wherein the at least one processor is further configured to:
    control the transceiver to resend, to the network, the RAU request message including the at least one eDRX parameter.

8. The UE of claim 6,
    wherein the at least one processor is further configured to, if the UE has used an eDRX parameter before sending the RAU request message, continue to use the eDRX parameter, and
    wherein the eDRX parameter is obtained during the last attach or RAU procedure.

9. The UE of claim 6, wherein the at least one processor is further configured to:
    apply one of a normal UE specific DRX and a cell specific DRX.

10. The UE of claim 9, wherein the at least one processor is further configured to:
    apply one of the normal UE specific DRX and the cell specific DRX in case that the RAU accept message is not integrity protected.

* * * * *